United States Patent [19]

Keith, Jr.

[11] Patent Number: 4,735,607
[45] Date of Patent: Apr. 5, 1988

[54] NASOGASTRIC TUBE ANTIREFLUX VALVE

[75] Inventor: Charles W. Keith, Jr., St. Louis, Mo.

[73] Assignee: H. P. Bruemmer Corp., Hazelwood, Mo.

[21] Appl. No.: 862,039

[22] Filed: May 12, 1986

[51] Int. Cl.⁴ ............................................. A61M 31/00
[52] U.S. Cl. ........................................ 604/54; 604/45; 604/129; 604/247; 604/256; 137/526; 137/854
[58] Field of Search .................... 604/49, 50, 54, 45, 604/128, 129, 118, 119, 247, 317, 319, 324, 251, 256, 94, 30, 31, 35, 43; 137/526, 854, 215, 217

[56] References Cited

U.S. PATENT DOCUMENTS

| | | |
|---|---|---|
| 386,603 | 7/1888 | Parsons . |
| 2,568,566 | 9/1951 | Sokolik . |
| 3,419,009 | 12/1968 | Ericson . |
| 3,583,404 | 6/1971 | McWhorter ........................ 604/247 |
| 3,599,641 | 8/1971 | Sheridan ............................ 604/256 |
| 3,730,209 | 5/1973 | Binard et al. . |
| 3,982,540 | 9/1976 | Ross . |
| 3,982,546 | 9/1976 | Friend ................................. 604/249 |
| 4,502,502 | 3/1985 | Krug ................................... 604/118 |
| 4,508,533 | 4/1985 | Abramson .......................... 604/45 |
| 4,513,784 | 4/1985 | Farrand et al. .................... 137/854 |
| 4,573,965 | 3/1986 | Russo ................................. 604/128 |

FOREIGN PATENT DOCUMENTS 2523452 5/1973 Fed. Rep. of Germany .
0127168 8/1982 Japan ................................. 137/854

OTHER PUBLICATIONS

Nursing magazine, vol. 7, No. 9, Sep. 1977, at pp. 54–57.

Primary Examiner—C. Fred Rosenbaum
Assistant Examiner—Mario Costantino
Attorney, Agent, or Firm—Polster, Polster & Lucchesi

[57] ABSTRACT

A valve to prevent gastric reflux or leakage through the vent lumen of a double-lumened nasogastric tube. The valve allows the passage of air into the vent lumen when atmospheric pressure exceeds stomach pressure. When stomach pressure exceeds atmospheric pressure the valve prevents flow of fluids through the tube.

15 Claims, 1 Drawing Sheet

NASOGASTRIC TUBE ANTIREFLUX VALVE

BACKGROUND OF THE INVENTION

This invention relates to improvements in tubes which are inserted into the body. More particularly, the invention involves the prevention of leakage from the vent lumen of a double-lumened nasograstric tube.

Nasogastric tubes are commonly used in hospitals and nursing homes to remove fluids from the stomach or to administer nutritives or medicines to a patient.

Nasogastric tubes are used, for example, postoperatively to prevent pooling of liquids in the stomach during recovery of the digestive function. They are also used in treatment of bleeding ulcers to remove blood from the stomach. They are also used for protecting gastric suture lines, for preventing and treating paralytic ileus, to decompress the stomach in circumstances which create outside pressure on the stomach, and in a host of other conditions.

The tube is conventionally a flexible plastic tube which is passed through the nasal canal, through the pharynx, and then down the esophagus into the stomach or small intestine. The lower or distal end of the tube in the stomach includes several openings or suction eyes to allow the passage of fluids.

When the tube is used for removing fluids from the stomach, the upper or proximal end of the tube is connected through a collector vessel to a vacuum pump system. Stomach fluids are drawn through the openings in the distal end of the tube, and into the collector vessel.

The openings in the distal end of the tube tend to become clogged. There are two major causes of such clogging. Debris in the stomach tends to be drawn into the openings. Further, as suction is applied to the nasogastric tube, the distal end of the tube drifts in the direction of the openings toward the wall of the stomach. Should the tube engage the wall of the stomach, occlusion of the openings may occur as the soft stomach lining (gastric mucosa) is drawn into the openings. Not only is the action of the tube blocked, but serious damage may be done to the wall of the stomach.

To help prevent blockage of the openings of a nasogastric tube, a double-lumened tube is generally used. The double lumened tube contains both a suction tube or lumen and a vent tube or lumen parallel to the suction lumen. Generally, both lumens are provided in a single tube, the vent lumen being a tube-within-a-tube. The vent lumen includes at least one small orifice into the suction lumen near their distal ends, to permit atmospheric air to be drawn through the vent lumen into the suction lumen.

A common commercially available double-lumened nasogastric tube is sold by Sherwood Medical Company under the trademark Salem Sump. The Salem Sump tube is formed as a tube-within-a-tube. The proximal end of the vent lumen is a pigtail about one foot long. The distal end of the vent lumen includes both an aperture into the suction lumen and a pair of openings into the stomach in its outer wall, on the side of the tube opposite the suction openings. The use and operation of the Salem Sump tube is described in an article by Edwina A. McConnell, in Nursing magazine, volume 7, number 9, September 1977, at pages 54–7, reprinted in Nursing 82.

When food or medication is passed down the suction lumen, the vent lumen is clamped or plugged, or air pressure is applied afterwards to clear the vent lumen. The present invention is primarily concerned with the functioning of a double-lumened nasogastric tube when suction is applied to the suction lumen.

During normal suctioning operation of the nasogastric tube, a small amount of atmospheric air is drawn through the vent lumen into the suction lumen at their distal ends, and is mixed with the stomach fluid as it is drawn from the stomach. During normal operation air bubbles will be visible in the stomach fluid as it passes through the tubing to the collector vessel. Should the suction tube openings become occluded, the presence of atmospheric air modifies the intensity of vacuum pressure spiking at the point of occlusion. Therefore, risk of damage to the stomach wall is reduced. Presence of atmospheric air at the point of occlusion also provides inducement for the tube to separate from the obstruction, thereby permitting the tube to resume normal operation.

The size of the orifice between the vent lumen and the suction lumen is chosen carefully to avoid interference with the normal operation of the suction lumen, and to diminish sudden spiking of vacuum pressure within the suction lumen should its openings become occluded. Other aspects of the system are also chosen carefully to balance efficiency of suctioning against the danger of occlusion. For example, either the suction on the pump is set to a low value, about 30–40 millimeters of mercury, or the pump is set to run intermittently (such as five seconds on and five seconds off at about 80–120 millimeters of mercury). These settings are selected so that the vacuum pressure at the suction openings is maintained below the level of capillary fragility, 25 millimeters of mercury. Should the stomach lining be drawn into the suction openings at a higher suction, serious damage to the lining can occur.

It will be seen that proper operation of the double lumen nasogastric tube depends on the continuous availability of atmospheric air to the suction openings through the aperture between the suction tube and the vent tube at their distal ends.

Unfortunately, double lumen nasogastric tubes frequently do not operate as intended. When stomach pressure is greater than atmospheric pressure, gastric reflux or leakage can occur, causing stomach fluids to escape through the vent lumen and out the pigtail onto the patient. Stomach pressure sufficient to cause gastric reflux is relatively common. It can be caused by as simple a force as coughing. It may also be caused, for example, by an overfilled stomach or by external pressure on the stomach caused by fluids in the abdominal cavity.

Reflux through the vent lumen of a double-lumened tube causes problems associated with the spillage of liquids through the pigtail and may also interfere with proper operation of the nasogastric tube.

The leakage of fluids due to gastric reflux can create severe medical problems. Stomach fluids are very acidic and will contribute to skin breakdown on contact. Leaking stomach or intestinal fluids can cause contamination of wounds, tubing and catheters. The leakage can be a source of hospital acquired (nosocomial) infections. Other medical problems can include inaccurate measurement of gastric secretions.

Spillage of stomach fluids causes further hospital problems. The burden of handling leakage or spills due to gastric reflux is usually the responsibility of the nursing staff. The recommended procedure is to wash the patient and change the patient's gown and bedliners following a period of leakage. Removal of equipment connections to the patient may also be required. This consumes a great deal of nursing time and adds to the cost of care. Unfortunately, the patient and bed are not always changed immediately following an episode of gastric reflux. Failure to change the patient may be the result of limited nursing resources or may be because the patient can not be removed from critical intravenous tubes, monitoring equipment or the like. The patient may thus be required to lie in the soiled bed for inordinate time periods, which causes patient discomfort, and may cause fear and additional medical problems.

Gastric reflux also may clog the vent lumen, either by drawing solid particles into the lumen or by drawing sufficient liquid into the vent lumen that the low or intermittent suction being applied to the suction lumen is insufficient to clear the vent lumen. Blockage of the vent lumen can lead to loss of function of the nasogastric tube and can result in stomach lesions and pooling of gastric fluids.

Gastric reflux has long been recognized as a problem with double-lumened nasogastric tubes. The generally recommended procedure for preventing reflux is to place the pigtail above the patient's midline, and to place the collection trap of the suction tube below the patient's midline. Unfortunately, the recommended placement of the tubes is not always practical, and even with such placement gastric reflux may occur. Maintaining the pigtail above the patient's midline generally involves pinning it to the patient's pillow, thereby severely limiting his or her head movement and adding significantly to discomfort. If the outlet of the vent tube is below the patient's midline (the approximate level of liquid in the patient's stomach), the vent tube can act as a siphon.

Nurses have developed a number of unorthodox techniques for precluding gastric reflux from the vent lumen of a double-lumened nasogastric tube. These include placing a stopper (such as a golf tee or a pencil tip) in the pigtail of the vent lumen, tying a surgical glove over the pigtail, or allowing the leakage to pool onto a napkin or into a receptacle. The first two methods defeat the function of the vent lumen. The third is tedious, further restricts patient movement, and frequently fails.

SUMMARY OF THE INVENTION

One of the objects of this invention is to provide a method and device for preventing the leakage of stomach fluids or gastric secretions from the vent lumen of a double-lumened nasogastric tube while maintaining the intended function of the vent lumen during evacuation of the stomach.

Another object of this invention is to provide such a method and device which prevent clogging of the vent lumen.

Another object of this invention is to provide such a method and system in which proper operation of the system is independent of the placement of the pigtail of the vent lumen, thereby enhancing patient comfort.

Another object of this invention is to provide such a method and device which are inexpensive and easy to use.

Another object of this invention is to provide such a device which may be utilized as a plug for the vent tube when the suction tube is used for administering food and medication and which may close the vent and suction lumens when the nasogastric tube is disconnected from suction.

Other objects of this invention will be apparent to those skilled in the art in light of the following description and accompanying drawings.

In accordance with the method of the present invention, generally stated, a method is provided for removing fluids from a body cavity of a patient by means of a novel double-lumened tube having a proximal end and a distal end, the tube including a suction lumen and a vent lumen, the method being characterized by the prevention of reflux through the vent lumen. The method comprises a step of inserting into the cavity of the patient the distal end of the tube, and a step of applying suction to the proximal end of the suction lumen. The vent lumen includes a valve which passes atmospheric air into the distal end of the tube through the vent lumen when pressure at the distal end of the vent lumen is less than atmospheric pressure and closes the vent lumen when pressure at the distal end of the vent lumen equals or exceeds atmospheric pressure, thereby providing a closed column of air in the vent lumen and preventing fluid from escaping from the cavity through the vent lumen.

The pressure differential at which the valve opens is preselected by the design of the valve to be quite small, so that the valve opens whenever pressure at the distal end of the vent lumen is slightly less than ambient.

Preferably, the valve is a separate one-way valve inserted into a pigtail at the proximal end of the vent lumen prior to the step of inserting the tube into the cavity of the patient. Preferably, the body cavity is the stomach or upper intestine and the tube is a nasogastric tube.

By inserting the valve into the vent lumen pigtail before the tube is inserted into the stomach, a column of air is entrained in the vent lumen as the tube is inserted. Gastric reflux through the vent tube is therefore prevented during insertion of the tube as well as during operation. The solid stem of the valve may also be placed in the proximal end of the suction lumen during insertion of the tube into the patient, to provide a closed system. This method may also be used whenever the proximal end of the suction tube is removed from the suction source, for example to check the return of the patient's gastro-intestinal function to normal or to permit movement of the patient.

If liquids are administered through the suction tube, the valve will prevent reflux of the liquids through the vent tube, without capping the vent tube.

The valve is preferably configured to permit easy insertion and removal of the valve from the pigtail and to permit easy closing of the proximal ends of the vent and suction lumens when the tube is removed from the suction source. The preferred valve includes a hollow stem portion sized to fit snugly in the pigtail, a hollow head portion, opening means in the head portion for admission of ambient air into the head portion, one-way valve means in the head portion, and a solid connection means for closing the proximal end of the suction lumen when the suction lumen is removed from a suction source. The solid connecton means is preferably a solid stem portion which may be inserted into the proximal end of the suction lumen when it is removed from the suction source, to close the system.

Preferably, the one-way valve comprises a perforated restriction plate mounted in the head portion below the opening means. A flexible disc below the restriction plate is normally closed, but opens in response to a drop in pressure in the hollow stem.

The valve also functions to prevent siphoning. Because the valve prevents siphoning, the distal end of the vent lumen or pigtail may be allowed to hang free without regard to its position relative to the patient's midline.

DESCRIPTION OF THE PREFERRED EMBODIMENT

Figure 1:
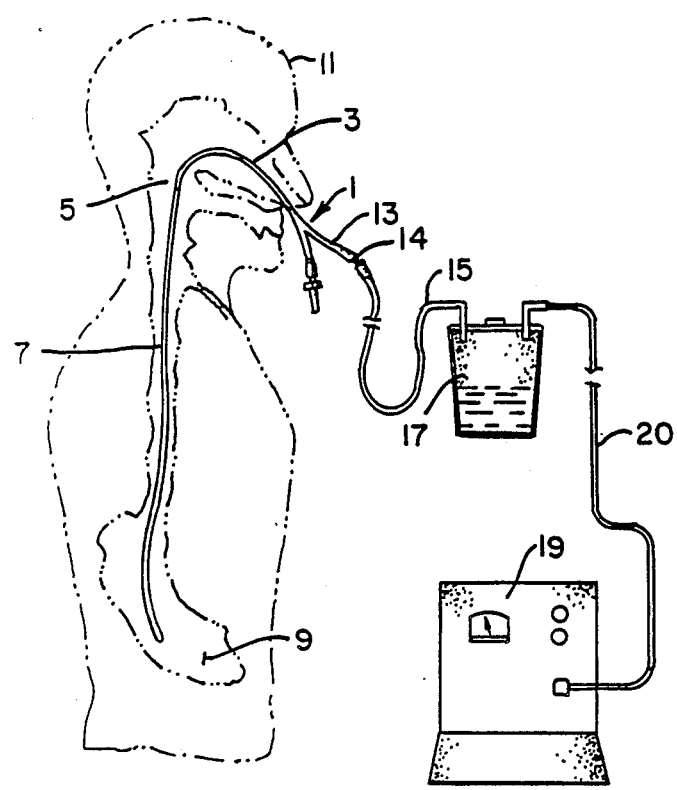
FIG. 1 is a somewhat diagramatic view of a nasogastric tube of the present invention, attached to a suction device and inserted into the stomach of a patient for evacuating the stomach.
Figure 3:
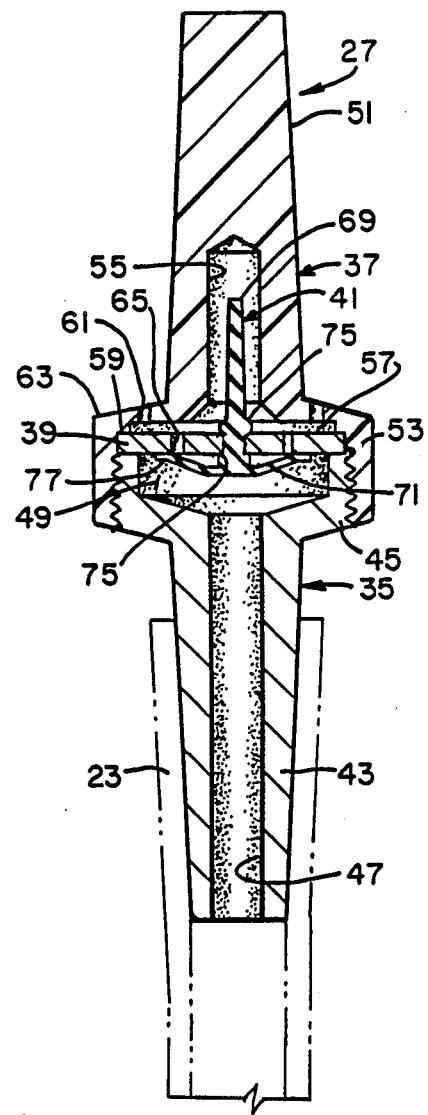
FIG. 3 is a sectional view of the valve portion of the nasogastric tube of FIGS. 1 and 2.
Figure 2:
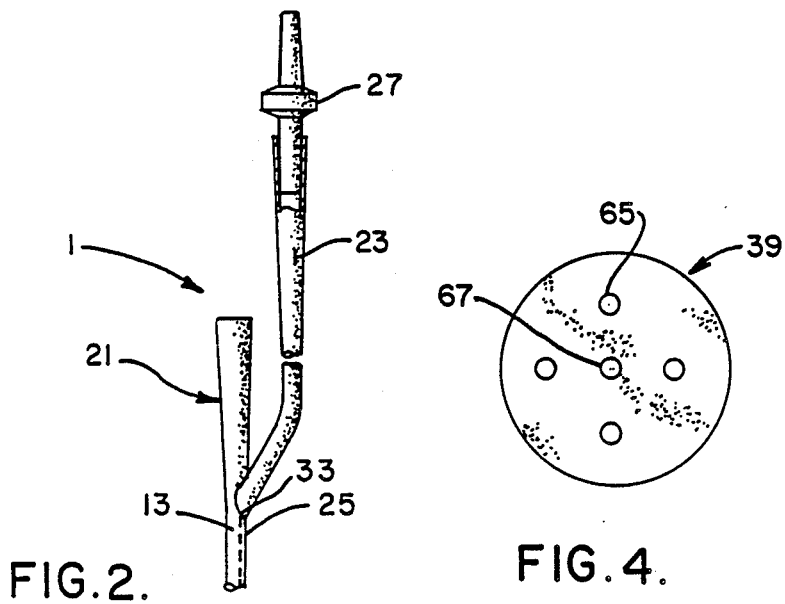
FIG. 2 is a view in elevation of the nasogastric tube of FIG. 1, partially broken away, showing a valve portion thereof.
Figure 4:
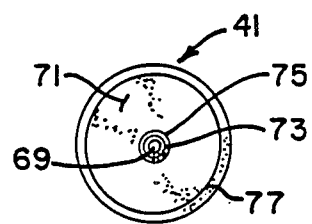
FIG. 4 is a top plan view of a restriction plate portion of the valve of FIG. 3.
Figure 5:
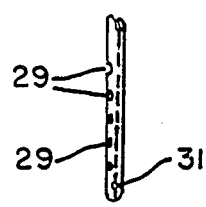
FIG. 5 is a top plan view of a flexible disc valve portion of the valve of FIG. 3.

Referring now to the drawings, and in particular to FIG. 1, reference numeral 1 indicates one illustrative embodiment of nasogastric tube of the present invention. The tube 1 is shown inserted through the nose 3, pharynx 5, and esophagus 7 into the stomach 9 of a patient 11. The upper or proximal end of a suction lumen 13 of the tube 1 is connected by a 5-in-1 adaptor 14 and tubing 15 to a collection vessel 17, which is in turn connected to an intermittent suction pump 19 by tubing 20. The arrangement of FIG. 1 is standard and well-known in the art except for the modified nasogastric tube 1.

The nasogastric tube 1 is a commercially available Salem Sump tube 21, having inserted in the pigtail 23 of its vent lumen 25 a one-way valve 27 in accordance with the present invention.

As is well known in the art, a Salem Sump tube 21 includes a quarter-inch diameter flexible plastic tube, about forty-seven inches long. The tube is divided by an internal wall or septum into the suction lumen 13 and the vent lumen 25. The lower or distal end of the tube 21 is closed.

The exterior wall of the suction lumen 13 is perforated as indicated at 29, to provide a single hole 3.0" from the distal end of the tube 21, and four pairs of holes 2.5", 2.0", 1.5" and 1.0" from the distal end of the tube. The vent lumen 25 is perforated as indicated at 31, to provide vent holes 0.5" from the distal end of the tube 21: two holes which extend through the exterior of the tube 21 and an aperture which extends through the septum separating the vent lumen 25 from the suction lumen 13. The sizes of the holes 29 and 31 are carefully chosen to prevent the suction at the holes 29 from exceeding about 25.0 mm of mercury under normal operating suction, to protect the lining of the stomach.

The upper or proximal end of the suction lumen 13 is flared, to accept a standard 5-in-1 adaptor 14. The proximal end of the vent lumen 25 terminates in a pigtail 23, a separate piece of tubing tightly inserted into an opening 33 cut in the exterior wall of the vent lumen 25 and spaced 1.5" from the proximal end of the tube 21. The proximal end of the pigtail 23 is flared. To distinguish the vent tube from the suction tube, the pigtail 23 is colored blue.

The valve 27 has a height of about 2.5" and a maximum diameter of about 0.75". It includes two body parts 35 and 37, a perforated disk 39, and a flexible disc valve 41.

The body parts 35 and 37 are molded of aluminum. For purposes which will become apparent, the first body part 35 is anodized blue and the second body part 37 is anodized a contrasting color such as gray.

The first body part 35 includes a one-inch long stem part 43 and a head part 45. The exterior of the stem part 43 is tapered to fit snugly into the flared end of the pigtail 23, and the exterior of the head part 45 is threaded. A bore 47 extends axially through the stem part 43 to a cylindrical chamber 49 in the head part 45.

The second body part 37 includes a one-inch long stem part 51 and a head part 53. The exterior of the stem part 51 is tapered to fit snugly into the flared end of the suction tube 13 and into the pigtail 23. A bore 55 extends axially into the stem part 51 of the second body part to a cylindrical chamber 57 in the head part 53. The end of the stem part 51 is solid. The interior of the head part 53 is threaded to mate with the exterior threads on the head part 45 of the first body part 35. An annular ledge 59 spaces the disk 39 from the bottom of the chamber 57. Four holes 61 extend through a shoulder 63 between the stem 51 and head 53. The holes 61 provide a passage between the chamber 57 and the ambient atmosphere.

The disk 39 is made of aluminum. It includes four air passages 65 and a central mounting hole 67 through it. It is held to the ledge 59 of the second body part by the upper face of the head part 45 of the first body part 35 when the first and second body parts are screwed together. The disk 39 separates the chamber 49 from the chamber 57.

The flexible disc valve 41 is made of resilient rubber. It includes a tail 69 and a cap 71. The proximal end of the tail 69 includes a step 73 for spacing the center of the cap 71 from the disc 39, and a protuberance 75 for frictionally holding the flexible disc valve in the central mounting hole 67 of the disk 39. The periphery of the cap 71 includes a rim 77 which engages the face of the disk 39 when pressures on opposite sides of the disk are equal.

In assembling the valve 27, the tail 69 of flexible disc valve 41 is pulled through the mounting hole 67 of the disk 39 until the step 73 seats on the disk and the protuberance 75 engages the opposite side of the disk, to mount the flexible disc valve 41 securely on the disk. In this position, the rim 77 of the flexible disc valve prevents fluid flow from its side of the disk 39 to the other side, but permits air flow in the opposite direction with a very small pressure differential, on the order of two millimeters of mercury.

The assembled disk 39 and valve 41 are then dropped into the second body part 37, with the tail 69 extending into the bore 55 and the margin of the disk 39 seated on the ledge 59. The first body part is then screwed tightly into the second body part to complete the assembly.

All passage of fluid (including air) through the valve 27 between the ambient atmosphere and the outlet of bore 47 is through holes 61, chamber 57, holes 65, chamber 49, and bore 47. As previously noted, flow from the bore 47 to the atmosphere is blocked by the flexible disc valve 41.

The blue stem 43 of valve 27 is preferably inserted into the blue pigtail 23 of the tube 1 before the tube 1 is inserted into a patient. The valve 27 is held frictionally in the pigtail 23 to form an air-tight fit with the vent lumen 25. Upon insertion of the tube 1 into the patient, the valve 27 ensures that the entire vent lumen 25 forms an air column and prevents liquids from being drawn into the vent lumen. The flared proximal end of the suction tube 13 is placed over the gray stem 51 of the valve to close the system and prevent reflux of gastric fluids through either lumen.

The tube 1 is inserted into the patient in the usual manner. The proper length of tube is measured and marked. The distal end of the tube is lubricated and inserted through a nostril until it reaches the pharynx. The patient then swallows while the tube is advanced into the stomach. After testing to be sure that the distal end of the tube is in the stomach, the proximal end of the tube is taped to the patient's nose. The proximal end of the tube is then removed from the stem 51 and connected through 5-in-1 connector 14 and collection vessel 17 to a standard suction pump 19. The pump 19 is set to provide either intermittent suction of eighty to one hundred twenty millimeters of mercury, or to provide continuous suction of thirty to forty millimeters of mercury.

The holes 61 and 65 in the valve 27 are sized to permit unrestricted flow through the valve 27 and vent lumen 25.

So long as pressure at the openings 31, at the distal end of the vent lumen 25 within the stomach, is less than atmospheric pressure, the tube 21 acts precisely like a Salem Sump tube without the valve 27. Atmospheric air is drawn through the valve 27 and vent lumen 25 into the distal end of the suction tube 13 and/or into the stomach 9. A small amount of atmospheric air is drawn through the vent lumen 25 into the suction lumen 13 and is mixed with the stomach fluid as it is drawn from the stomach. Should the suction tube openings 29 become occluded, the presence of atmospheric air at the distal ends of the vent lumen 25 and the suction lumen 13 modifies the intensity of vacuum pressure spiking at the point of occlusion, thereby reducing risk of damage to the stomach wall and providing opportunity for the tube 21 to separate from the occlusion and to resume operation.

When pressure at the distal end of the vent tube 25 equals or exceeds atmospheric pressure, the flexible disc valve 41 immediately blocks fluid flow through the valve 27. Gastric fluids are therefore blocked by the column of air in the vent lumen 25 from rising in the vent lumen.

It will be seen that while the valve 27 is closed, it greatly reduces the chances that gastric reflux will cause particles to clog the vent lumen 25. The column of air in the vent lumen 25 is maintained at the same pressure found at the openings 31, and this pressure is greater than or equal to atmospheric pressure. When pressure in the stomach is greater than atmospheric pressure, gastric fluids will rise a short distance into the vent lumen 25 to compress the air column until air pressure and gastric pressure are approximately balanced. Should the suction openings 29 become occluded, the increased air pressure in the vent lumen 25 speeds the flow of the viscous gastric fluid out of the vent lumen 25, to permit air to reach the points of occlusion and break the suction, thereby tending to reduce or level the high vacuum spiking at the point of occlusion and reducing trauma to gastric mucosa. If vacuum within the suction lumen is sufficiently increased by occlusion, the valve 27 will open.

If pressure within the stomach is reduced below atmospheric pressure, the valve 27 immediately opens.

It will be seen that the positioning of the pigtail 23 and valve 27 relative to the midline of the patient does not affect the operation of the valve 27 and the nasogastric tube 1. Both gastric reflux and siphoning are prevented even though the pigtail 23 is not pinned to the patient's pillow but is allowed to hang free below patient midline.

If liquids are passed down the suction lumen 13, the valve 27 prevents gastric reflux of the liquids. In accordance with standard practice, the suction pump 19 is disconnected for several minutes after administration of nutrients or medication through the tube 21. The valve 27 may also be removed for irrigation of the tube 1 by injecting saline through the vent lumen 25.

The valve may also be removed for connecting the pigtail to the 5-in-1 connector 14 to seal the system when the suction tube is removed from the suction pump tubing 15. Preferably, however, the system may be sealed by removing the 5-in-1 connector from the suction lumen and leaving it connected to the suction pump tubing 15; the solid stem 51 of the valve 27 is placed in the proximal end of the suction lumen 13 to seal the system. This arrangement permits air to be drawn into the patient's stomach if stomach pressure drops below atmospheric pressure.

Numerous variations in the present tube and its use, within the scope of the appended claims, will be apparent to those skilled in the art in light of the foregoing description and accompanying drawings.

Merely by way of example, the valve 27 may be made of different materials. Other one-way valves may be used in the valve 27. Indicator means may be provided in the valve 27 to indicate that stomach pressure has exceeded atmospheric pressure. Although the preferred embodiment of valve opens at a very slight pressure differential across it, the magnitude of the operating differential may be varied somewhat to suit the needs of a particular application, in accordance with known valve design. The solid stem may instead be female, for receiving the adaptor 14 to close the system.

The valve 27 may be formed as an integral part of the pigtail 23, although some advantages may be lost, in particular the ability to purge the system easily by removing the valve and injecting saline through the pigtail. One way to retain the ability to purge the system is to form a one-way duckbill valve of the same material as the tube and bond it into the upper end of the pigtail with the duckbill extending into the pigtail.

The tube may be of different design and may include additional lumens (the term "double-lumened" being understood to include multiple-lumened tubes), although the design of the Salem Sump tube offers advantages in the practice of the invention. Although the tube is described as a nasogastric tube inserted into the stomach, the invention may be applied to the suctioning of other body cavities, particularly the upper intestine, where reflux may be a problem.

These variations are merely illustrative.

I claim:

1. A method for removing fluids from the stomach or upper intestine of a patient by means of a double-lumened nasogastric tube having a proximal end and a distal end, the tube including a suction lumen and a vent lumen open to ambient, and for preventing reflux of stomach contents through the vent lumen, the method comprising a step of inserting the distal end of the tube through the nasal canal and esophagus into the stomach or small intestine, and a step of applying suction to the proximal end of the suction lumen, the vent lumen including a one-way valve, the one-way valve pasing ambient air into the distal end of the tube through the vent lumen when pressure at the distal end of the vent lumen is less than ambient pressure and closing the vent lumen when pressure at the distal end of the vent lumen exceeds ambient pressure to provide a closed column of air in the vent lumen and prevent fluid from escaping the stomach or small intestine through the vent lumen.

2. The method of claim 1 wherein the one-way valve is inserted into the proximal end of the vent lumen prior to the step of inserting the tube into the stomach or small intestive of the patient.

3. The method of claim 1 wherein the vent lumen and the suction lumen are formed in a single tube through the major part of their length, and wherein the proximal end of the vent lumen is formed as an extension of the vent lumen separate from the suction lumen to form a pigtail, and including a further step of allowing the pigtail to hang free during the step of applying suction to the suction lumen.

4. The method of claim 3 including a step of inserting the one-way valve into the proximal end of the vent lumen prior to the step of inserting the tube into the cavity of the patient.

5. The method of claim 4 wherein the one-way valve includes a solid stem portion, the method including a step of removing suction from the proximal end of the suction lumen, and thereafter a step of inserting the solid stem portion into the proximal end of the suction lumen to close the system.

6. A nasogastric suction tube sized for insertion of the distal end of the tube throuqh the nasal canal and esophagus into the stomach or small intestine of a patient, said tube comprising a suction lumen having proximal and distal ends. the suction lumen having opening means in its distal end and means at its proximal end for attaching the suction lumen to a suction source; a vent lumen having proximal and distal ends, the proximal end of the vent lumen being open to ambient, the vent lumen having opening means in its distal end for allowing air to enter the distal end of the suction tube; and one-way valve means in the vent lumen for closing the vent lumen to trap a closed column of air in the vent lumen when the pressure differential between pressure at the proximal end of the vent lumen and pressure at the distal end of the vent lumen is less than a predetermined value and for opening the vent lumen to permit ambient air to pass through the vent lumen when the pressure differential between pressure at the proximal end of the vent lumen and presure at the distal end of the vent lumen exceeds the predetermined value.

7. The tube of claim 6 wherein the proximal end of the vent lumen is formed as an extension of the vent lumen separate from the suction lumen to form a pigtail, and wherein the one-way valve means is in the pigtail.

8. The tube of claim 7 wherein the one-way valve means is separable from the tube, the one-way valve means including a hollow stem portion sized to fit in the pigtail.

9. The tube of claim 8 wherein the one-way valve means further includes a hollow head portion, opening means in the head portion for admission of ambient air, a one-way valve in the head portion for preventing fluid through the head portion from the hollow stem through the opening means to the ambient, and means for engaging the proximal end of the suction lumen to form a closed system when the suction lumen is disconnected from the vacuum source.

10. The tube of claim 9 wherein the one-way valve includes a valve seat and a movable closure member cooperative with the valve seat, the closure member sealing against the valve seat when pressure at the proximal end of the vent lumen is equal to or less than pressure at the distal end of the vent lumen.

11. The tube of claim 10 wherein the movable closure member is a flexible disk.

12. The tube of claim 7 wherein the one-way valve means further comprises means for engaging the proximal end of the suction lumen to form a closed system when the suction lumen is disconnected from the vacuum source.

13. A valve for use in a vent lumen of a double-lumened nasogastric tube having a suction lumen including a proximal end of the suction lumen and a vent lumen including a proximal end of the vent lumen, the valve comprising: a hollow stem portion sized to fit frictionally into the enlarged end of the vent lumen; a head portion rigidly connected to the hollow stem portion; opening means in the head portion for admission of ambient air into the head portion; one-way valve means in the head portion for preventing fluid flow through the head portion from the hollow stem through the opening means to the ambient and for permitting ambient air to flow through the head portion from the opening means through the stem portion; and a tapered second stem portion rigidly attached to the head portion and sized to fit frictionally with the proximal end of the suction lumen for closing the proximal end of the suction lumen when the suction lumen is removed from a suction source.

14. A method of preventing siphoning through the open end of a vent tube of a double-lumened nasogastric tube comprising placing a one-way valve in the open end of the vent tube and extending the nasogastric tube through the nasal canal and esophagus into the stomach or small intestine of a patient, so as to maintain a trapped column of air in the vent tube to prevent expulsion of stomach contents through the vent tube.

15. In a nasogastric suction tube sized for insertion of the distal end of the tube through the nasal canal and esophagus into the stomach or small intestine of a patient, said tube comprising:
  a. a suction lumen having proximal and distal ends, the suction lumen having opening means in its distal end and means at its proximal end for attaching the suction lumen to a suction source, and
  b. a vent lumen having proximal and distal ends, the vent lumen having opening means in its distal end for allowing air to enter the dital end of the suction tube and being open to ambient at its proximal end, the improvemenet comprising
  c. means for preventing siphoning of fluids through the vent tube, the means for preventing siphoning comprising one-way valve means for closing the vent lumen to trap a closed column of air in the vent lumen when pressure at the distal end of the vent lumen is equal to or greater than ambient pressure at the proximal end of the vent lumen.

* * * * *

UNITED STATES PATENT AND TRADEMARK OFFICE
CERTIFICATE OF CORRECTION

PATENT NO. : 4,735,607

DATED : April 5, 1988

INVENTOR(S) : Charles W. Keith, Jr.

It is certified that error appears in the above-identified patent and that said Letters Patent is hereby corrected as shown below:

Column 9, Line 7 (Claim 1) is "pasing", should be "passing"

Column 9, Line 18 (Claim 2) is "intestive", should be "intestine"

Column 9, Line 41 (Claim 6) is "ends.", should be "ends,"

Column 10, Lines 1 and 2 (Claim 9) is " fluid through", should be "fluid flow through"

Column 10, Line 58 (Claim 15) is "dital", should be "distal"

Signed and Sealed this

Eleventh Day of October, 1988

Attest:

DONALD J. QUIGG

*Attesting Officer*  *Commissioner of Patents and Trademarks*